United States Patent Office 3,329,679
Patented July 4, 1967

3,329,679
FUSED-RING IMIDAZOQUINAZOLINES, PYRIMIDOQUINAZOLINES AND RELATED COMPOUNDS
Theodore S. Sulkowski, Narberth, and Scott J. Childress, Philadelphia, Pa., assignors to American Home Products Corporation, New York, N.Y., a corporation of Delaware
No Drawing. Filed Dec. 22, 1965, Ser. No. 515,719
10 Claims. (Cl. 260—256.4)

ABSTRACT OF THE DISCLOSURE

This invention is concerned with new and novel imidazolines, pyrimidoquinazolines, imidazolinones and pyrimydaquinazolines which are pharmacologically active as central nervous system depressants. Further, this invention is concerned with the preparation of these compounds by the reaction of a 2-(N-substituted methoxycarbonylamino)phenyl carbonyl compound with a substituted alkylene diamine to form a imidazoquinazolinone or a pyrimidoquinazolinone of the present invention which may then be reduced to form their corresponding imidazoquinazolines or pyrimidoquinazolines.

---

This invention relates to new and useful fused-ring organic nitrogen compounds as well as to a novel method for their preparation. In particular, the present invention is concerned with imidazoquinazolines, pyrimidoquinazolines, imidazoquinazolinones and with pyrimidoquinazolinones having pharmacodynamic activity.

The novel compounds which are included within the purview of this invention are selected from the group having the general formula:

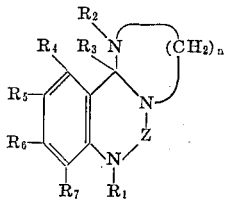

wherein $R_1$ and $R_2$ are selected from the group consisting of hydrogen and lower alkyl; $R_3$ is selected from the group consisting of phenyl, halophenyl, and thienyl; $R_4$, $R_7$, and $R_5$ and $R_6$ when taken separately, are selected from the group consisting of hydrogen, trifluoromethyl, and halo; $R_5$ and $R_6$ when taken together with the benzo radical to which they are attached form a naphthylene ring; Z is selected from the group consisting of methylene and carbonyl; $n$ is an integer of from 2 to 3; and the pharmaceutically acceptable acid addition salts thereof.

The new compounds of the aforesaid formula where Z is keto, and the integer $n$ is 2, properly are called "imidazoquinazolinones." Typical examples thereof are 9-chloro - 1,2,3,10b - tetrahydro - 10b - phenylimidazo[1,2-c]quinazolin-5(6H)-one and 9-chloro-1,2,3,10b-tetrahydro - 1 - methyl - 10b - phenylimidazo[1,2 - c]quinazolin-5(6H)-one.

Alternatively, where Z is methylene and the integer $n$ is 2, the compounds are called: "imidazoquinazolines." Examples of these imidazoquinazolines are 9-chloro-1,2,3,5,6,10b - hexahydro - 10b - phenylimidazo[1,2 - c]quinazoline, 9 - chloro-1,2,3,5,6,10b-hexahydro-1-methyl-10b-phenylimidazo[1,2-c]quinazoline, and 9-chloro-1,2,3,5,6,10b - hexahydro - 6 - methyl - 10b - phenylimidazo[1,2-c]quinazoline.

Those compounds of the above formula where Z is keto and the integer $n$ is 3 are properly designated: "pyrimidoquinazolinones," such as 10-chloro-1,2,3,4,7,11b - hexahydro - 11b - phenyl - 6H - pyrimido[1,2 - c]quinazolin - 6 - one and 1,2,3,4,7,11b-hexahydro-11b-(2-thienyl)-6H-pyrimido[1,2-c]quinazolin-6-one.

Conversely, where Z is methylene and the integer $n$ is 3, the compounds are: "pyrimidoquinazolines," for example, 10-chloro-1,3,4,6,7,11b-hexahydro-11b-phenyl-2H-pyrimido[1,2-c]quinazoline and 1,3,4,6,7,11b-hexahydro-11b - phenyl - 10 - trifluomethyl - 2H - pyrimido[1,2 - c]quinazoline.

In accord with the present invention, the afore-mentioned imidazoquinazolines, pyrimidoquinazolines, imidazoquinazolinones and pyrimidoquinazolinones have been found to possess interesting pharmaceutical properties which render them useful as synthetic medicinals. More particularly, these compounds have been shown to exhibit utility as potent central nervous system depressants. In addition to their pharmacological utility, the imidazoquinazolinones and pyrimidoquinazolinones compounds of the present invention are utilized as intermediates in the manufacture of the corresponding imidazoquinazolines and pyrimidoquinazolines.

In accord with the process of the present invention, the above-mentioned imidazoquinazolinones and pyrimidoquinazolinones may be prepared by the reaction of a compound of the formula:

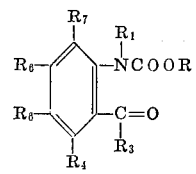

wherein $R_1$, $R_3$, $R_4$, $R_5$, $R_6$ and $R_7$ have the same meaning as previously set forth; and R is lower alkyl, with a substituted alkylene diamine of the formula:

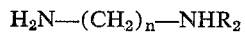

$$H_2N-(CH_2)_n-NHR_2$$

wherein the integer $n$ and R are as defined above. The reaction is effected by heating a substantially equimolar mixture of the reactants in an inert organic solvent at a temperature from about 30° C. to about 100° C. for a period of from about one to about twenty-four hours. Preferably, the reaction is conducted in toluene at the reflux temperature of the reaction mixture for a period of 14 to 18 hours. After the reaction is complete, the products are obtained by conventional methods such as concentration and crystallization. The product may then be recrystallized from suitable solvents, such as ethanol and dimethylformamide.

The imidazoquinazolines and pyrimidoquinazolines of the present invention are prepared by reducing the corresponding above prepared imidazoquinazolinones and pyrimidoquinazolinones. Although various reduction procedures may be employed, a preferred method to effect this conversion is the utilization of a reducing agent, such as, lithium aluminum hydride. Utilizing this preferred method, the imidazoquinazolinones or pyrimidoquinazolinones are slowly added to an agitated ether suspension or lithium aluminum hydride, and the resulting mixture is refluxed until the reduction is complete, usually between 10 and 16 hours. Thereafter, the excess reducing agent is decomposed by the addition of water and the ether layer is separated, dried and evaporated to dryness. The residue is the desired imidazoquinazoline or pyrimidoquinazoline product.

In accord with the above described procedure, the general reactants listed in Table I, are reacted to produce the listed imidazoquinazolinones and pyrimidoquinazolinones which may be further converted by reduction to their corresponding imidazoquinazolines and pyrimidoquinazolines listed in Table II. These imidazoquinazolinones, pyrimidoquinazolinones, imidazoquinazolines and pyrimidoquinazolines are representative of the type of compounds within the scope of the present invention. It is intended that the word "substituted" as employed in Tables I and II shall also include the corresponding unsubstituted hydrogen containing moiety.

TABLE I

| Reactants | Imidazoquinazolinones and Pyrimidoquinazolinones |
| --- | --- |
| 2-(N-substituted methoxycarbonylamino)-substituted benzophenone and an N-substituted ethylenediamine. | 1,6-substituted-10b-substituted phenyl-1,2,3,10b-tetrahydroimidazo[1,2-c]quinazolin-5(6H)-one. |
| 3-(substituted benzoyl)-2-methoxycarbonylamino naphthalene and an N-substituted ethylene diamine. | 1-substituted-12b-substituted phenyl-1,2,3,12b-tetrahydroimidazo[1,2-c]benzo[g]quinazolin-5(6H)-one. |
| 2-(N-substituted methoxycarbonylamino)-substituted benzophenone and an N-substituted 1,3-diaminopropane. | 1,7-substituted-11b-substituted phenyl-1,2,3,4,7,11b-hexahydro-6H-pyrimido[1,2-c]quinazolin-6-one. |

TABLE II

| Imidazoquinazolinones and Pyrimidoquinazolinones | Imidazoquinazolines and Pyrimidoquinazolines |
| --- | --- |
| 1,6-substituted-10b-substituted phenyl-1,2,3,10b-tetrahydroimidazo[1,2-c]quinazolin-5(6H)-one. | 1,6-substituted-10b-substituted phenyl-1,2,3,5,6,10b-hexahydroimidazo[1,2-c]quinazoline. |
| 1-substituted-12b-substituted phenyl-1,2,3,12b-tetrahydroimidazo[1,2-c]benzo[g]quinazolin-5(6H)-one. | 1-substituted-12b-substituted phenyl-1,2,3,5,6,12b-hexahydroimidazo[1,2-c]benzo[g]quinazoline. |
| 1,7-substituted-11b-substituted phenyl-1,2,3,4,7,11b-hexahydro-6H-pyrimido[1,2-c]quinazolin-6-one. | 1,7-substituted-11b-substituted phenyl-1,3,4,6,7,11b-hexahydro-2H-pyrimido[1,2-c]quinazoline. |

Many of the reactants employed in the process of this invention are known compounds which are readily available from commercial sources, while the remainder can easily be prepared in accord with standard organic procedures well known to those skilled in the art. The 2-(N-substituted methoxycarbonylamino)-substituted benzophenone, 3-(substituted benzoyl)-2-methoxycarbonylamino naphthalene and 2-(N-substituted methoxycarbonylamino)-substituted benzophenone reactants are synthesized by the reaction of the appropriate 2-aminobenzophenone or 2-aminonaphthalene with methyl chloroformate.

When the compounds of this invention are employed as central nervous system depressants, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen.

Furthermore, it will vary with the particular subject under treatment. Generally treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a small quantity given parenterally. In general the compounds of this invention are most desirably administered at a concentration level that will generally afford effective results without causing any harmful or deleterious side effects and preferably at a level that is in the range of from about 0.5 mg. to about 200 mg. per kg. of body weight per day, although as aforementioned variations will occur. However, a dosage level that is in the range of from about 2 mg. to about 30 mg. per kg. of body weight per day is most desirably employed in order to achieve effective results.

The following examples are given by way of illustration and are not be construed as limitations of this invention, many variations of which are possible without departing from the scope and spirit thereof.

*Example I*

Seventeen grams of 2-methoxycarbonylamino-5-chlorobenzophenone, 150 ml. of toluene, and 30 ml. of ethylenediamine are refluxed for 16 hours in a flask equipped with a water separator. The solution is filtered while hot, then allowed to cool to room temperature. The precipitated solid is separated by filtration and washed with cold ethanol. On recrystallization from ethanol, there is obtained 9 - chloro-1,2,3,10b-tetrahydro-10b-phenylimidazo[1,2-c]quinazolin-5(6H)-one, M.P. 278–9° C.

*Analysis.*—Calc'd for $C_{16}H_{14}ClN_3O$: C, 64.10; H, 4.70; N, 14.02; Cl, 11.83. Found: C, 64.10; H, 4.69; N, 13.92; Cl, 11.6.

*Example II*

Ten grams of 2-methoxycarbonylamino-5-chlorobenzophenone, 75 ml. of toluene, and 20 ml. of N-methylethylenediamine are refluxed for 16 hours in a flask equipped with a water separator. The solution is filtered while hot, cooled to room temperature and evaporated in vacuo to a solid residue. On recrystallization from dimethylformamide there is obtained 9-chloro-1,2,3,10b-tetrahydro-1-methyl - 10b-phenylimidazo[1,2-c]quinazolin-5(6H)-one, M.P. 275–7° C.

*Analysis.*—Calc'd for $C_{17}H_{16}ClN_3O$: C, 65.07; H, 5.03; N, 13.39; Cl, 11.30. Found: C, 65.07; H, 5.14; N, 13.07; Cl. 11.3

Example III

Ten grams of 3-benzoyl-2-methoxycarbonylamino naphthalene, 100 ml. of toluene and 25 ml. of ethylenediamine are refluxed for 16 hours in a flask equipped with a water separator. The solution is filtered while hot and cooled to room temperature. The precipitated solid is separated by filtration and washed with alcohol. On recrystallization from dimethylformamide there is obtained 1,2,3,12b-tetrahydro - 12b-phenylimidazo[1,2-c]benzo(g)quinazolin-5(6H)-one, M.P. 315° C.

*Analysis.*—Calc'd for $C_{20}H_{17}N_3O$: C, 76.16; H, 5.43; N, 13.33. Found: C, 75.81; H, 5.34; N, 13.02.

Example IV

When the procedure described in the foregoing examples is followed reacting the hereinafter listed benzophenones with the appropriate diamine, the following corresponding products are obtained:

| Starting Compounds | Product |
| --- | --- |
| 2-(N-methylcarbomethoxyamino)-5-chlorobenzophenone. | 9-chloro-1,2,3,10b-tetrahydro-6-methyl-10b-phenylimidazo[1,2-c]quinazolin-5(6H)-one. |
| 2-methoxycarbonylamino-2',5-dichlorobenzophenone. | 9-chloro-1,2,3,10b-tetrahydro-10b-(o-chlorophenyl)-imidazo[1,2-c]quinazolin-5(6H)-one. |
| 2-methoxycarbonylamino-4,5-dichlorobenzophenone. | 8,9-dichloro-1,2,3,10b-tetrahydro-10b-phenyl-imidazo[1,2-c]quinazolin-5(6H)-one. |
| 2-carbomethoxyamino-5-bromobenzophenone. | 9-bromo-1,2,3,10b-tetrahydro-10b-phenyl-imidazo[1,2-c]quinazolin-5(6H)-one. |

Example V

Eight grams of 2-carbomethoxyamino-5-chlorobenzophenone, 100 ml. of toluene, and 20 ml. of 1,3-diaminopropane are refluxed in a flask equipped with a water separator. After 2 hours the reaction mixture solidifies. The solid is separated by filtration and washed thoroughly with hot ethanol. After drying there is obtained 10-chloro-1,2,3,4,7,11b - hexahydro - 11b - phenyl - 6H - pyrimido[1,2-c]quinazolin-6-one, M.P. 281–2° C.

*Analysis.*—Calc'd for $C_{17}H_{16}ClN_3O$: C, 65.07; H, 5.14: N, 13.39; Cl, 11.30. Found: C, 64.91; H, 5.00; N, 13.32; Cl, 11.4.

In a similar manner, from 2-methoxycarbonylaminophenyl-2-thienyl ketone and 1,3-diaminopropane there can be obtained 1,2,3,4,7,11b-hexahydro-11b-(2-thienyl)-6H-pyrimido[1,2-c]quinazolin-6-one.

Example VI

The following compounds are prepared according to the procedure of Example V employing the corresponding substituted 2-methoxycarbonylamino-benzophenones and 1,3-diaminopropanes as starting materials:

1,2,3,4,7,11b - hexahydro - 11b - phenyl - 10 - trifluoromethyl-6H-pyrimido[1,2-c]quinazolin-6-one, and
1,2,3,4,7,11b - hexahydro - 7 - methyl - 11b - phenyl - 6H-pyrimido[1,2-c]quinazolin-6-one.

Example VII

Five grams of 9 - chloro - 1,2,3,10b - tetrahydro - 10b-phenylimidazo[1,2-c]quinazolin-5(6H)-one are added to a stirred suspension of 3 grams of lithium aluminum hydride in 200 ml. of anhydrous ether and refluxed 14 hours. The excess hydride is decomposed by cautious addition of water. The ether layer is separated, dried over magnesium sulfate, then evaporated to a solid residue. On recrystallization from ethanol, there is obtained 9-chloro - 1,2,3,5,6,10b - hexahydro - 10b - phenylimidazo[1,2-c]-quinazoline, M.P. 139–141° C.

*Analysis.*—Calc'd for $C_{16}H_{16}ClN_3$: C, 67.24; H, 5.64; N, 14.70; Cl, 12.41. Found: C, 67.28; H, 5.52; N, 14.42; Cl, 12.4.

In a similar manner, 9-chloro-1,2,3,10b-tetrahydro-1-methyl - 10b - phenylimidazo[1,2-c]quinazolin - 5(6H)-one is converted to 9-chloro-1,2,3,5,6,10b-hexahydro-1-methyl-10b-phenylimidazo[1,2-c]-quinazoline.

Example VIII

Ten grams of 9-chloro-1,2,3,10b-tetrahydro-6-methyl-10b - phenylimidazo[1,2 - c]quinazolin - 5(6H) - one are added to a suspension of 3 grams of lithium aluminum hydride in 400 ml. of anhydrous ether and refluxed, with agitation, for 14 hours. The excess lithium aluminum hydride is decomposed by the slow addition of water. Thereafter, the ether layer is separated, dried over magnesium sulfate, and evaporated to a solid residue of 9 - chloro - 1,2,3,5,6,10b - hexahydro - 6 - methyl - 10b-phenylimidazo[1,2-c]quinazoline.

Example IX

Two and half grams of 10-chloro-1,2,3,4,7,11b-hexahydro-11b-phenyl - 6H - pyrimido[1,2-c]quinazolin-6-one are added with agitation to 1.5 grams of lithium aluminum hydride and 100 ml. of anhydrous ether and the mixture is refluxed for 12 hours. Thereafter, water is added to decompose the unreacted hydride and the ether layer is separated. This layer is dried over magnesium sulfate and then evaporated to dryness. The residue which is recrystallized from ethanol is 10-chloro-1,3,4,6,7,11b-hexahydro-11b-phenyl-2H-pyrimido[1,2-c]quinazoline.

Example X

The compounds of Example VI are reduced to the corresponding pyrimidoquinazolines by the procedure of Example IX to produce respectively:

1,3,4,6,7,11b.- hexahydro - 11b - phenyl - 10 - trifluoromethyl-2H-pyrimido[1,2-c]-quinazoline, and
1,3,4,6,7,11b - hexahydro - 7 - methyl - 11b - phenyl - 2H-pyrimido[1,2-c]quinazoline.

What is claimed is:
1. A compound selected from the group consisting of those having the formula:

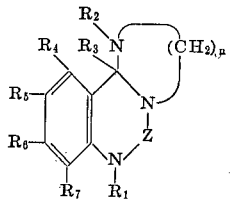

where $R_1$ and $R_2$ are selected from the group consisting of hydrogen and lower alkyl; $R_3$ is selected from the group consisting of phenyl, halophenyl and thienyl; $R_4$, $R_7$, and $R_5$ and $R_6$ when taken separately, are selected from the group consisting of hydrogen, trifluoromethyl, and halo; $R_5$ and $R_6$ when taken together with the benzo radical to which they are attached from a naphthylene ring; Z is selected from the group consisting of methylene and carbonyl; $n$ is an integer of from 2 to 3; and the pharmaceutically acceptable acid addition salts thereof.

2. A compound as described in claim 1 which is 1,2,3,12b - tetrahydro - 12b - phenylimidazo[1,2-c]benzo[g]quinazolin-5(6H)-one.

3. A compound as described in claim 1 which is 9-chloro-1,2,3,10b-tetrahydro-10b - phenylimidazo[1,2-c]quinazolin-5(6H)-one.

4. A compound as described in claim 1 which is 9-chloro - 1,2,3,10b - tetrahydro - 1 - methyl - 10b-phenyl-imidazo[1,2-c]quinazolin-5(6H)-one.

5. A compound as described in claim 1 which is 9-chloro - 1,2,3,5,6,10b - hexahydro - 10b - phenylimidazo[1,2-c]quinazoline.

6. A compound as described in claim 1 which is 10-chloro - 1,2,3,4,7,11b - hexahydro - 11b - phenyl - 6H-pyrimido[1,2-c]quinazolin-6-one.

7. A compound as described in claim 1 which is 1,2,3,4,7,11b-hexahydro - 11b - (2 - thienyl)-6H-pyrimido[1,2-c]quinazolin-6-one.

8. A compound as described in claim 1 which is 9-chloro-1,2,3,5,6,10b-hexahydro - 6 - methyl-10b-phenyl-imidazo[1,2-c]quinazoline.

9. A process for the production of a compound of the formula:

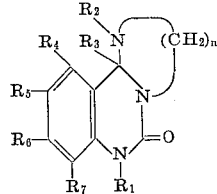

wherein $R_1$ and $R_2$ are selected from the group consisting of hydrogen and lower alkyl; $R_3$ is selected from the group consisting of phenyl, halophenyl and thienyl; $R_4$, $R_7$, and $R_5$ and $R_6$ when taken separately, are selected from the group consisting of hydrogen, trifluoromethyl, and halo; $R_5$ and $R_6$ when taken together with the benzo radical to which are attached form a naphthylene ring; $n$ is an integer of from 2 to 3, which comprises contacting a compound of the formula:

$$H_2N—(CH_2)_n—NHR_2$$

wherein $n$ and $R_2$ are defined as above, with a compound of the formula:

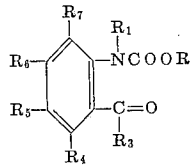

wherein $R_1$, $R_3$, $R_4$, $R_5$, $R_6$, and $R_7$ are defined as above; and R is lower alkyl, in a reaction-inert organic solvent at a temperature that is in the range from about 30° C. to about 100° C. for a period of from about one to about twenty-four hours.

10. A process as described in claim 9 wherein the reaction-inert organic solvent is toluene and the reaction is conducted at the reflux temperature of the reaction mixture.

No references cited.

ALEX MAZEL, *Primary Examiner.*

MARY O'BRIEN, *Assistant Examiner.*